Nov. 17, 1931.   F. A. HOWARD   1,832,396
AIRCRAFT
Filed June 5, 1925

FRANK A. HOWARD Inventor
By A. Straw Attorney

Patented Nov. 17, 1931

1,832,396

UNITED STATES PATENT OFFICE

FRANK A. HOWARD, OF ELIZABETH, NEW JERSEY, ASSIGNOR TO STANDARD OIL DEVELOPMENT COMPANY, A CORPORATION OF DELAWARE

AIRCRAFT

Application filed June 5, 1925. Serial No. 35,037.

My invention relates to improvements in aircraft, and will be fully understood from the following specification, taken in connection with the attached drawings.

Figure 1:
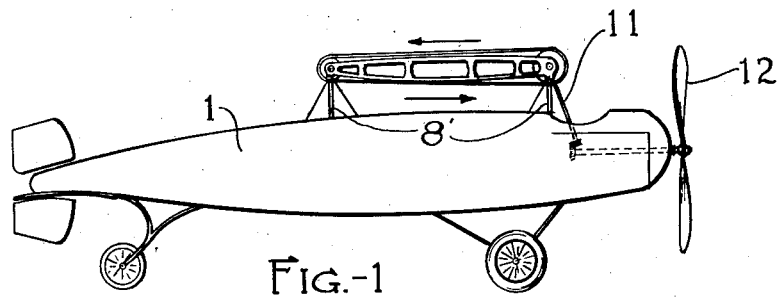
Figure 5:
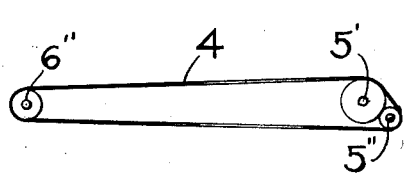
Figure 2:
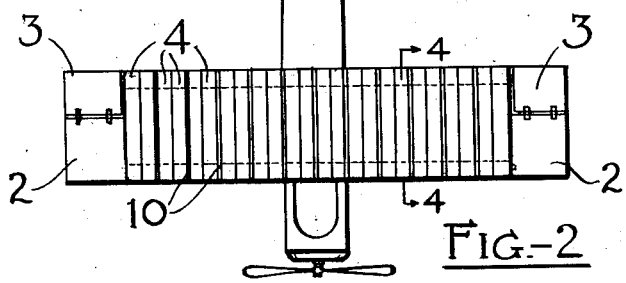
Figure 3:
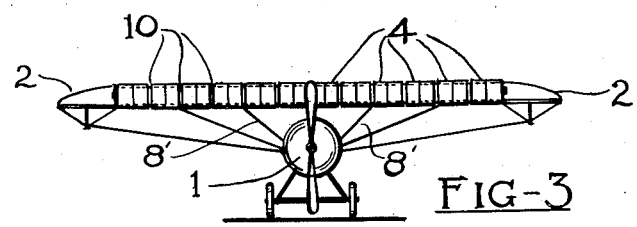
Figure 4:
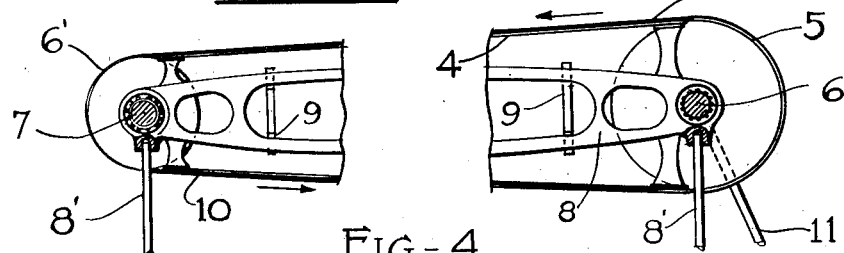

In these drawings, Figure 1 represents a side-elevation, of an airplane embodying my invention; Figure 2 is a top plan view; Figure 3 is a front elevation; Figure 4 is an enlarged cross-section on the line 4—4 of Figure 2; and Figure 5 is a diagrammatic section of a modified form of aerofoil.

The airplane illustrated is of the monoplane type, that is, has a single horizontally disposed aerofoil, the construction of which, in particular, constitutes subject matter of the present invention. The aerofoil is mounted above the fuselage, which is designated 1, and which may be in all particulars of standard construction. The aerofoil of the present invention is made up of a center section of special construction and end sections of ordinary construction. The end sections are designated 2 and are equipped with the usual ailerons, designated 3. The center section has its surface formed by a plurality of relatively narrow steel or fabric belts of the type used for very high belt speeds, designated 4. These belts travel over pulleys, designated 5 and 6', pulleys 5 being mounted on the front edge of the central section of the aerofoil and keyed to a driveshaft 6, which extends the full length of this central section. The rear pulleys 6', which are preferably smaller than the front pulleys, as shown, are similarly mounted upon a shaft 7 lying at the rear edge of the central section of the aerofoil. The shafts 6 and 7 are spaced apart by truss ribs 8, which form the fore and aft structural members of the central section of the aerofoil. Certain of these ribs carry the usual struts 8' which support the aerofoil from the fuselage. Preferably, one of these ribs is arranged between each adjacent pair of belts. Longitudinal structural members, designated 9, tie the ribs 8 together, so that the whole constitutes a rigid frame, forming a mounting for the shafts 6 and 7. The latter may be mounted in anti-friction bearings in the ends of the ribs. The necessary space between the adjacent pulleys 5 and 6', which space is required to admit the ribs 8, is covered by a narrow stationary surface member, designated 10, supported by the ribs and of sufficient width to fill the gap between the adjacent belts, so that the aerofoil as a whole presents a smooth and uninterrupted surface.

The driveshaft 6 is driven from the motor of the airplane by a shaft, designated 11, which is equipped on its ends with beveled gears for transmitting motion from the crankshaft of the engine to the shaft 6 or may be driven by separate engine or by chain drive. The direction of motion of the belts is indicated by the arrows in Figure 1, that is, the lower surface of the belts travels forwardly of the machine, and the upper surface rearwardly. It is preferred that the propeller 12 of the machine should be disposed at a somewhat higher elevation than is common, with relation to the aerofoil, so that the maximum effect of the slip stream from the propeller may be exerted upon the belts constituting the central section of the aerofoil. The gear ratios employed for driving the shaft 6 from the motor of the machine are such as to give a surface velocity of the belts in the neighborhood of three to four times the designed air speed of the machine.

The advantage of the construction illustrated and described in the foregoing is that, by utilization of the belt construction for the surface of the central section of the aerofoil, the permissible starting and landing speeds for the machine are greatly reduced, with resultant increase in safety and greater serviceability.

The ratio of the central section to the end sections of the aerofoil may be fixed by the designer to attain the desired decrease in starting and landing speeds with a minimum sacrifice of the lift to drift ratio.

In Fig. 5 I have illustrated a possible modification of the form of the aerofoil. In this modification the main pulleys designated 5' and 6" are supplemented by an idler pulley 5" which causes the belt 4 to assume a form more closely approaching that of an efficient aerofoil of ordinary construction. It is obvious that by the use of one or more idlers in this manner the form of the aerofoil of the present invention may be changed within wide limits should it appear that the resultant gain in efficiency justifies the complication.

Although the invention has been illustrated in connection with a monoplane, it will be understood that this is for simplicity only and that it is susceptible of application to any known form of airplane.

What I claim is:

1. In combination with a fuselage, an aerofoil comprising rotatable cylindrical members of different diameters disposed transversely of the fuselage, the member of larger diameter constituting the leading edge and the member of smaller diameter constituting the trailing edge of the aerofoil, a flexible belt forming the surface of said aerofoil and adapted to travel around said rotatable members in a direction only such that the lower face of the belt moves in the normal direction of motion of the aerofoil, said belt being composed of a plurality of independent parallel members, and having its end sections made up of non-rotating surfaces.

2. In combination with an airplane body, an aerofoil mounted transversely thereon, a flexible belt surface for the aerofoil, members adapted to carrying said belt surface and forming the leading and trailing edges of the aerofoil, means for causing the belt surface to travel in a direction only such that its lower face moves in the normal direction of motion of the aerofoil, stationary sections at the ends of the aerofoil, and ailerons mounted on the end sections.

3. An aerofoil comprising laterally disposed rotating cylindrical members constituting the leading and trailing edges of the aerofoil, the surface of the said aerofoil being made up of a flexible belt traveling around said rotating members in a direction only such that the lower face of the belt moves in the normal direction of motion of the aerofoil, and the end sections of the aerofoil being made up of stationary surfaces.

FRANK A. HOWARD.